(12) United States Patent
Morita et al.

(10) Patent No.: US 8,227,528 B2
(45) Date of Patent: Jul. 24, 2012

(54) CURABLE EPOXY RESIN COMPOSITION AND CURED PRODUCT THEREOF

(75) Inventors: Yoshitsugu Morita, Chiba (JP); Hiroshi Ueki, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 325 days.

(21) Appl. No.: 12/675,499

(22) PCT Filed: Aug. 19, 2008

(86) PCT No.: PCT/JP2008/065066
§ 371 (c)(1),
(2), (4) Date: Feb. 26, 2010

(87) PCT Pub. No.: WO2009/028432
PCT Pub. Date: Mar. 5, 2009

(65) Prior Publication Data
US 2010/0216913 A1      Aug. 26, 2010

(30) Foreign Application Priority Data

Aug. 31, 2007   (JP) ................................ 2007-227140

(51) Int. Cl.
*C08L 63/00*   (2006.01)
*C08K 3/36*    (2006.01)

(52) U.S. Cl. .................. 523/466; 523/400; 525/476

(58) Field of Classification Search .................. 523/466, 523/400; 525/476
See application file for complete search history.

(56) References Cited

U.S. PATENT DOCUMENTS

| | | |
|---|---|---|
| 4,677,160 A | 6/1987 | Kondo et al. |
| 4,742,142 A | 5/1988 | Shimizu et al. |
| 4,782,112 A | 11/1988 | Kondo et al. |
| 4,911,974 A | 3/1990 | Shimizu et al. |
| 5,387,624 A | 2/1995 | Morita et al. |
| 5,492,945 A | 2/1996 | Morita et al. |
| 5,691,401 A | 11/1997 | Morita et al. |
| 5,891,966 A | 4/1999 | Murray et al. |
| 5,973,060 A | 10/1999 | Ozaki et al. |
| 6,117,933 A | 9/2000 | Ozaki et al. |
| 6,239,245 B1 | 5/2001 | Morita et al. |
| 7,399,803 B2 | 7/2008 | Morita et al. |
| 7,648,766 B2 | 1/2010 | Morita |

FOREIGN PATENT DOCUMENTS

| | | |
|---|---|---|
| EP | 0304946 A2 | 3/1989 |
| EP | 0365009 A2 | 4/1990 |
| EP | 0511833 A2 | 11/1992 |
| EP | 0548969 A1 | 6/1993 |
| EP | 0761791 A1 | 3/1997 |
| JP | 64-051467 A | 2/1989 |
| JP | 64-070558 A | 3/1989 |
| JP | 02-113079 A | 4/1990 |
| JP | 08-109262 A | 4/1996 |
| JP | 10-030050 A | 2/1998 |
| JP | 2007-138002 A | 6/2007 |
| WO | WO 2006-073055 A1 | 7/2006 |
| WO | WO 2009-028433 A1 | 3/2009 |

OTHER PUBLICATIONS

English language abstract for JP 64-051467 extracted from PAJ database, dated Jun. 15, 2010, 9 pages.
English language abstract for JP 64-070558 extracted from PAJ database, dated Jun. 15, 2010, 18 pages.
English language abstract for JP 02-113079 extracted from espacenet.com database, dated Jun. 18, 2010, 6 pages.
English language translation and abstract for JP 08-109262 extracted from PAJ database, dated Jun. 18, 2010, 71 pages.
English language translation and abstract for JP 10-030050 extracted from PAJ database, dated Jun. 15, 2010, 60 pages.
English language translation and abstract for JP 2007-138002 extracted from PAJ database, dated Jun. 15, 2010, 57 pages.
PCT International Search Report for PCT/JP2008/065066, dated Nov. 18, 2008, 4 pages.
PCT International Search Report for PCT/JP2008/065067, dated Dec. 4, 2008, 3 pages.
WO 2009/028433, Morita et al., published Mar. 5, 2009; equivalent to U.S. Appl. No. 12/675,508, filed Feb. 26, 2010.

*Primary Examiner* — Robert S Loewe

(74) *Attorney, Agent, or Firm* — Howard & Howard Attorneys PLLC

(57) ABSTRACT

A curable epoxy resin composition comprising: (I) a curable epoxy resin; (II) an epoxy-resin curing agent; and (III) a silicone rubber powder obtained by curing a condensation-curable silicone rubber composition in a dispersed state in water, the powder having an epoxy equivalent measured by titration equal to or lower than 3,000 and an average particle size in the range of 0.1 to 100 μm, possesses excellent flowability and which, when cured, forms a cured product that in spite of low modulus of elasticity possesses high strength.

15 Claims, No Drawings

CURABLE EPOXY RESIN COMPOSITION AND CURED PRODUCT THEREOF

RELATED APPLICATIONS

This application claims priority to and all the advantages of International Patent Application No. PCT/US2008/065066, filed on Aug. 19, 2008, which claims priority to Japanese Patent Application No. JP2007-227140, filed on Aug. 31, 2007.

TECHNICAL FIELD

The present invention relates to a curable epoxy resin composition and to a cured product obtained by curing the composition.

BACKGROUND ART

Curable epoxy resin compositions are used as sealants, adhesive agents, or similar substances for parts of electric and electronic devices. However, since cured products obtained by curing the compositions have a high modulus of elasticity and, therefore, high rigidity, such agents and sealants may increase stress in the aforementioned electric and electronic parts when subject to thermal expansion or curing contraction. It is known in the art to reduce the modulus of elasticity in a cured body of the composition by adding to the composition a silicone rubber powder that contains epoxy groups (see Japanese Unexamined Patent Application Publication S64-51467).

However, even with an addition of a silicone rubber powder the curable epoxy resin composition cannot provide sufficient decrease of modulus of elasticity and, in addition, impairs mechanical strength of the cured product. Based on a profound study conducted by the inventors herein for finding the factors that do not allow sufficient decrease of modulus of elasticity, it has been revealed that this occurs either because of a low content of epoxy groups in the silicone rubber powder and insufficient reaction thereof in the curable epoxy resin composition, or because the silicone rubber powder obtained by an addition reaction has dispersity in organic resins inferior to the silicone rubber powder obtained by a condensation reaction.

It is an object of the present invention to provide a curable epoxy resin composition that possesses excellent flowability and that, when cured, forms a cured product which, in spite of low modulus of elasticity, demonstrates high strength.

It is another object to provide a cured product demonstrates low modulus of elasticity in combination with high strength.

DISCLOSURE OF INVENTION

A curable epoxy resin composition comprises:
(I) a curable epoxy resin;
(II) an epoxy-resin curing agent; and
(III) a silicone rubber powder obtained by curing a condensation-curable silicone rubber composition in a dispersed state in water, the powder having an epoxy equivalent measured by titration equal to or lower than 3,000 and an average particle size in the range of 0.1 to 100 μm.

Component (I) is a preferably a biphenyl-containing epoxy resin, component (II) is a compound that contains phenolic hydroxyl groups, which, in turn, is preferably a phenol resin that contains biphenyl groups.

Component (II) is added in an amount at which the content of epoxy-reactive functional groups of component (II) is in the range of 0.5 to 2.5 moles per 1 mole of epoxy groups contained in component (I).

Component (III) is a silicone rubber powder that has type A durometer hardness according to JIS K 6253 equal to or greater than 50 and is obtained by curing a silicone rubber composition comprising the following components (A) through (D) in a water-dispersed state:
  (A) a diorganopolysiloxane capped at both molecular terminals with silanol groups and having in one molecule 30 or less silicon atoms;
  (B) an organopolysiloxane having in one molecule at least two silicon-bonded hydrogen atoms {the mole number of silicon-bonded hydrogen atoms contained in this component is equal to or lower than 80% of the mole number of silanol groups in component (A)};
  (C) an epoxy-containing alkoxysilane {the mole number of silicon-bonded alkoxy groups contained in this component is equal to or greater than 40% of the mole number of silanol groups remained after subtraction of the mole number of the silicon-bonded hydrogen atoms of component (B) from the mole number of silanol groups of component (A)}; and
  (D) a condensation-reaction catalyst {used in an amount of 0.01 to 5 parts by weight per 100 parts by weight of the sum of components (A) to (C)}.

Component (III) is added in an amount of 0.1 to 100 parts by weight per 100 parts by weight of the sum of components (I) and (II).

The epoxy resin composition may further comprise (IV) an inorganic filler, which preferably has particles of a spherical shape, in particular spherical amorphous silica. Component (IV) is added in an amount of at least 20 wt. % of the composition.

The epoxy resin composition may further comprise (V) a cure promoter for curing the epoxy resin. Component (V) is added in an amount of 0.001 to 20 parts by weight per 100 parts by weight of component (I).

The epoxy resin composition of the invention preferably is used as a sealing agent for semiconductor devices.

A cured product of the invention is obtained by curing the epoxy resin composition described above.

Effects of Invention

The curable epoxy resin composition of the invention is characterized by excellent flowability and, when cured, forms a cured product that, in spite of low modulus of elasticity, has high strength. The cured product of the invention is characterized by low modulus of elasticity in combination with high strength.

DETAILED DESCRIPTION OF THE INVENTION

Let us first consider in more details the curable epoxy resin composition of the invention.

A curable epoxy resin that constitutes component (I) is the main component of the composition. There are no special restrictions with regard to this component and any epoxy resin can be used for the purposes of the invention provided that this resin contains in one molecules at least one glycidyl group, alicyclic epoxy group, or a similar epoxy group. Preferable is epoxy resin having in one molecule two or more epoxy groups. Such a component (I) can be represented by novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, or sulfur-containing epoxy resin. Component (I) may be composed of two or more epoxy resins of the aforementioned types. Most preferable for use as component (I) are aralkyl-type epoxy resin with a biphenyl skeleton, biphenyl-type epoxy resin, or similar resins that contain biphenyl groups.

Normally, component (I) is a readily available material. For example, the biphenyl-type epoxy resin is produced by Japan Epoxy Resin Co., Ltd. under trademark YX-4000; the bisphenol-F type epoxy resin is produced by Nippon Steel Chemical Co., Ltd. under trademark VSLV-80XY; the aralkyl-type epoxy resin with a biphenyl skeleton is produced by Nippon Kayaku Co., Ltd. under trademarks NC-3000 and CER-3000L (mixtures of biphenyl-type epoxy resins); and the naphthol-aralkyl-type epoxy resin is produced by Nippon Steel Chemical Co., Ltd. under trademark ESN-175.

If the composition of the invention is intended for use as a sealant or adhesive for semiconductor devices, the content of hydrolyzable chlorine in component (I) should not exceed 1000 ppm and preferably should not exceed 500 ppm. Furthermore, the contents of sodium and potassium in component (I) should not exceed 10 ppm, respectively. This is because under conditions of high temperature and high humidity the use of sealants or adhesives that contain hydrolyzable chlorine, sodium, or potassium in amounts exceeding the recommended upper limits may reduce moisture-resistant properties of semiconductor devices.

Component (II) is an epoxy resin curing agent which is used for reacting with epoxy groups of component (I) and for curing the composition of the invention. Preferably, component (II) is a compound that contains phenolic hydroxyl groups such as phenol-novolac resin, phenol resin that contains naphthalene rings, aralkyl-type phenol resin, triphenolalkane type phenol resin, phenol resin that contains biphenyl groups, alicyclic phenol resin, heterocyclic phenolinc resin, bisphenol-A, or bisphenol-F. Component (II) may be comprised of two or more such resins used in combination. Most preferable for use as component (II) is an aralkyl-type phenol resin that contains biphenyl groups, e.g. a phenol resin with biphenyl groups.

Component (II) is readily available. For example, the aralkyl-type phenol resin is produced under trademarks Milex XLC-3L by Mitsui Chemicals, Inc. and under trademark MEH-781 by Meiwa Plastic Industries, Ltd.; the phenol resin with naphthalene rings is produced by Nippon Steel Chemical Co., Ltd. under trademarks SN-475 and SN-170; the phenol-novolac resin is produced by Meiwa Plastic Industries, Ltd. under trademark MEH-7500; and the phenol resin that contains biphenyl groups is produced by Meiwa Plastic Industries, Ltd. under trademark MEH7851.

There are no special restriction with regard to the amount in which component (II) can be added provided that this is sufficient to cure component (I). It may be recommended, however, to add component (II) in such an amount that the content of functional epoxy-reactive groups in component (II) per one mole of the epoxy groups of component (I) is in the range of 0.5 to 2.5 moles. For example, when component (II) is a compound that contains phenolic hydroxyl groups, it is recommended to add component (II) in such an amount that the content of the phenolic hydroxyl groups of component (II) per 1 mole of epoxy groups of component (I) is in the range of 0.5 to 2.5 moles. If component (II) is added in the amount less than the recommended lower limit, the composition will show a tendency to insufficient curing. If, on the other hand, component (II) is added in the amount exceeding the recommended upper limit, this will impair strength of a produce obtained by curing the composition.

Component (III) is a silicone rubber powder which has an epoxy equivalent measured by titration equal to or lower than 3000 and which is added to the composition for reducing modulus of elasticity without adversely affecting strength of a cured product. This is because an epoxy equivalent exceeding 3000 will impair dispersibility of the powder in component (I), and the composition will not be able to sufficiently decrease modulus of elasticity in a product obtained by curing the composition. The epoxy resin equivalent of component (III) is determined by uniformly dispersing the silicone rubber powder in a hydrochloric acid solution of dioxane, thus causing the epoxy groups to react with hydrochloric acid, and then determining the epoxy resin equivalent by back titrating the excess hydrochloric acid with sodium hydroxide.

Component (III) should have an average particle size in the range of 0.1 to 100 μm, preferably in the range of 0.1 to 50 μm, more preferably in the range of 0.1 to 30 μm, and most preferably, in the range of 0.1 to 20 μm. If the average particle size is below the recommended lower limit, this will increase the tendency of the powder particles to aggregation and impair handlability of the powder. If, on the other hand, the average particle size exceeds the recommended upper limit, this will impair dispersibility of the powder in component (I). It is recommended that component (III) has type-A durometer hardness according to JIS K 6253 equal to or greater than 50. The harder is the silicone rubber powder, the greater its dispersibility in component (I). In order to provide sufficient decrease in modulus of elasticity of a cured body of the composition, hardness of the powder should not exceed 90.

There are no special restrictions with regard to the shape of component (III), provided that they allow curing of the condensation-curable silicone rubber composition in an aqueously dispersed state. For example, the particles may have a substantially spherical, real spherical, or another suitable shape. It is further recommended that the condensation-curable silicone rubber composition comprises:

(A) a diorganopolysiloxane capped at both molecular terminals with silanol groups and having in one molecule 30 or less silicon atoms;

(B) an organopolysiloxane having in one molecule at least two silicon-bonded hydrogen atoms {used in such an amount that the mole number of silicon-bonded hydrogen atoms contained in this component becomes equal to or lower than 80% of the mole number of silanol groups in component (A)};

(C) an epoxy-containing alkoxysilane {used in such an amount that the mole number of silicon-bonded alkoxy groups contained in this component become equal to or greater than 40% of silanol groups remaining after subtraction of the mole number of the silicon-bonded hydrogen atoms of component (B) from the mole number of silanol groups of component (A)}; and (D) a condensation-reaction catalyst {used in an amount of 0.01 to 5 parts by weight per 100 parts by weight of the sum of components (A) to (C)}.

The diorganopolysiloxane (A), which is the main component of the aforementioned composition, is capped at both molecular terminals with silanol groups and has in one molecule 30 or less silicon atoms. For more efficient introduction of epoxy groups into the obtained silicone rubber powder, it is recommended that the content of silicon atoms in one molecule of component (A) does not exceed 25, and preferably be 20 or below. In order to provide sufficient decrease in modulus of elasticity of a cured body of the composition, one molecule of component (A) should contain at least two, preferably at least three, and most preferably, at least five silicon atoms. The silicon-bonded groups contained in component (A) can be exemplified by substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; vinyl, allyl, butenyl, or similar alkenyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups. Preferable are alkyl, alkenyl, and aryl groups, especially, methyl, vinyl, and phenyl groups. Aforementioned component (A) can be represented by the following compounds: a dimethylpolysiloxane capped at both molecular terminals with silanol groups, a copolymer of dimethylsiloxane and methylphenylsiloxane capped at both molecular terminals with silanol groups, a copolymer of methylvinylsiloxane and dimethylsiloxane capped at both molecular terminals with silanol groups, or a methylphenylpolysiloxane capped at both molecular terminals with silanol groups.

The organopolysiloxane of component (B) is used for cross-linking of the aforementioned composition. One molecule of this component may contain at least two and, preferably, at least three silicon-bonded hydrogen atoms. Other silicon-bonded groups of component (B) may be comprised of substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups. Preferable are alkyl, and aryl groups, especially, methyl, and phenyl groups. There are no special restrictions with regard to the molecular structure of component (B) which may have a linear, cyclic, net-like, or partially-branched linear structure. The linear molecular structure is preferable. Although there are no special restriction with regard to viscosity of component (B) at 25° C., provided that this viscosity allows dispersing of the obtained composition in water, it may be recommended to maintain viscosity in the range of 1 to 10,000 mPa·s, preferably in the range of 1 to 1,000 mPa·s, and most preferably, in the range of 1 to 100 mPa·s. Aforementioned component (B) can be represented by the following compounds: a methylhydrogenpolysiloxane capped at both molecular terminals with trimethylsiloxy groups, a copolymer of methylhydrogensiloxane and dimethylsiloxane capped at both molecular terminals with trimethylsiloxy groups, a copolymer of methylhydrogensiloxane and dimethylsiloxane capped at both molecular terminals with dimethylhydrogensiloxy groups, a cyclic methylhydrogenpolysiloxane, or a cyclic copolymer of methylhydrogensiloxane and dimethylsiloxane.

Component (B) is added in such an amount at which the mole number of silicon-bonded hydrogen atoms contained in this component becomes equal to or lower than 80%, preferably in the range of 80% to 40%, and more preferably in the range of 70% to 40% than the mole number of silanol groups in component (A). If the content of component (B) is below the recommended lower limit, this will impair curability of the composition. If, on the other hand, the content of component (B) exceeds the recommended upper limit, it will be difficult to introduce a sufficient amount of epoxy groups into the obtained silicone rubber powder.

The epoxy-containing alkoxysilane that constitutes component (C) is used for introduction of epoxy groups into the obtained silicone rubber powder. Examples of alkoxy groups of component (C) are methoxy, ethoxy, propoxy, and methoxyethoxy groups. Most preferable from the viewpoint of high reactivity are methoxy and ethoxy groups. Epoxy groups of component (C) can be exemplified by 3-glycidoxypropyl or similar glycidoxy alkyl groups; 2-(3,4-epoxycyclohexyl)-ethyl, or similar epoxycyclohexylalkyl groups; 4-oxiranylbutyl, 8-oxiranyloctyl, or similar oxiranylalkyl groups. Component (C) may also contain other silicon-bonded groups, which may be represented by substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups. Aforementioned component (C) can be exemplified by the following compounds: 3-glycidoxypropyl-trimethoxysilane, 3-glycidoxypropyltriethoxysilane, 3-glycidoxypropyl-methyldimethoxysilane, 2-(3,4-epoxycyclohexyl) ethyltrimethoxysilane, and 2-(3,4-epoxycyclohexyl) ethylmethyldimethoxysilane. Most preferable from the viewpoint of high reactivity are 3-glycidoxypropyltrimethoxysilane and 2-(3,4-epoxycyclohexyl) ethyltrimethoxysilane, Component (C) should be added in such an amount that the mole number of silicon-bonded alkoxy groups contained in this component will have a value at which the mole number of silanol groups remaining after subtraction of the mole number of the silicon-bonded hydrogen atoms of component (B) from the mole number of silanol groups of component (A) will become equal to or greater than 40%, and preferably equal to or greater than 45%. If component (C) id added in an amount less than the recommended lower limit, it will be difficult to introduce epoxy groups to the obtained silicone rubber powder in a sufficient amount.

Component (D) is a condensation-reaction catalyst used for accelerating curing of the aforementioned composition. Examples of component (D) are the following: dibutyltin dilaurate, dibutyltin diacetate, tin octanoate, dibutyltin dioctate, tin laurate, or a similar organic tin compound; tetrabutyl titanate, tetrapropyl titanate, dibutoxybis(ethylacetoacetate) titanium, or a similar organic titanium compound, as well as hydrochloric acid, sulfuric acid, dodecylbenzenesulfonic acid, or a similar acidic compound; ammonia, sodium hydroxide, or a similar alkaline compound. Organic-tin and organic-titanium compounds are preferable.

Component (D) is added in an amount of 0.01 to 5 parts by weight, preferably 0.05 to 5 parts by weight, and most preferably 0.05 to 2 parts by weight per 100 parts by weight of the sum of components (A) through (C). If component (D) is added in an amount below the recommended lower limit, it will be difficult to provide complete curing of the obtained composition. If, on the other hands, the content of component (D) exceeds the recommended upper limit, it will be difficult to essentially accelerate curing.

The following is a more detailed description of the method for manufacturing the aforementioned silicone rubber powder.

First, according to the manufacturing method of the silicone rubber powder, the silicone rubber composition comprising components (A) through (C) is dispersed in water, then component (D) is added, and the composition is cured.

In order to improve stability and dispersibility in water, the composition may additionally be combined with a surfactant. The aforementioned surfactant may be of a nonionic type, cationic type, or of a betaine type. The particle size of the obtained silicone rubber powder will dependent on the type and the amount of the surfactant added. In order to obtain a silicone rubber powder with particles of a reduced size, it is recommended to add the surfactant in an amount of 0.5 to 50 parts by weight per 100 parts by weight of the composition. On the other hand, in order to increase the size of the particles, the amount of the surfactant added to the composition should be in the range of 0.1 to 10 parts by weight. It is recommended that water be used in an amount of 20 to 1,500 parts by weight per 100 parts by weight of the composition. The composition of the invention can be uniformly dispersed in water by means of an emulsifier. The emulsifier can be represented by Homo-Mixer®, a paddle-type mixer, Henschel Mixer®, Homo Disper®, colloidal mill, propeller-type stirrer, homogenizer, continuous action in-line emulsifier, ultrasonic emulsifier, or a vacuum-type kneader. After the composition is cured, the silicone rubber powder of component (III) is obtained in the form of an aqueous suspension. Therefore, the powder can be recovered by removing water from the suspension.

There are no special restrictions with regard to the amount in which component (III) can be used, but is recommended to add this component in an amount of 0.1 to 100 parts by weight, preferably 0.1 to 50 parts by weight, and most preferably 0.1 to 20 parts by weight per 100 parts by weight of the sum of components (I) and (II). If component (III) is used in an amount less than the recommended lower limit, there will be a tendency to increase of modulus of elasticity of acured product obtained by curing the composition. If, on the other hand, the added amount of component (III) exceeds the recommended upper limit, this will noticeably decrease strength of the cured product.

In order to improve mechanical strength of cured products obtained from the composition of the invention, the composition may be combined with an arbitrary inorganic filler (IV). Normally, when inorganic filler is added to a curable epoxy resin composition, strength of a cured body obtained from the composition is improved. However, addition of such a filler significantly impairs flowability and moldability of the composition and increases modulus of elasticity of the cured product. However, addition of component (III) to such a composition makes it possible to obtain a cured product of high strength without impairing flowability and moldability, in spite of low modulus of elasticity of a cured product.

There are no special restrictions with regard to component (IV) provided that this component is an inorganic filler normally miscible with the curable epoxy resin composition, Examples of such a component are the following: glass fiber, asbestos, alumina fibers, ceramic fibers composed of alumina and silica, boron fibers, zirconia fibers, silicon carbide fibers, metal fibers, or similar fibrous fillers; amorphous silica, crystalline silica, precipitated silica, fumed silica, baked silica, zinc oxide, baked clay, carbon black, glass bead, alumina, talc, calcium carbonate, clay, aluminum hydroxide, magnesium hydroxide, barium sulfide, titanium dioxide, aluminum nitride, boron nitride, silicon carbide, aluminum oxide, magnesium oxide, titanium oxide, beryllium oxide, kaolin, mica, zirconia, or a similar granulated filler. Component (IV) may be comprised of a combination of two or more of the above filler. There are no special restrictions with regard to the shape of component (IV) which may be spherical needle-shaped, plate-like, or in a crushed (irregular) form. The spherical shape is preferable for better moldability. Most referable is spherical amorphous silica. There are no special restrictions with regard to the average particle size of component (IV) but from the viewpoint of improved moldability the average particle size should be in the range of 0.1 to 50 µm. Component (IV) may comprise a mixture of inorganic fillers having different average particle sizes.

In order to improve conformity to component (I) the surface of the component (IV) can be pretreated with a silane coupling agent, titanate coupling agent, or a similar coupling agent. The silane coupling agents can be exemplified by 3-glycidoxypropyl trimethoxysilane, 3-glycidoxypropyl methyldiethoxysilane, 2-(3,4-epoxychlorohexyl) ethyltrimethoxysilane or a similar epoxy-containing alkoxysilane; N-(2-aminoethyl)-3-aminopropyl trimethoxysilane, 3-aminopropyl triethoxysilane, N-phenyl-3-aminopropyl trimethoxysislane, or a similar amino-containing alkoxysilane; 3-mercaptopropyl trimethoxysilane, or a similar mercapto-containing alkoxysilane; as well as 3-isocyanate-propyl triethoxysilane, and 3-ureidopropyl triethoxysilane. The titanate coupling agent can be exemplified by i-propoxytitanium tri(i-isostearate). Two or more such coupling agents can be used in combination. There are no restrictions with regard to the amount of coupling used for coating as well as with regard to the method of surface treatment.

There are no special restrictions with regard to the amount in which component (IV) can be added to the composition of the invention, but it may be recommended to have this component in the amount of at least 20 wt. %, preferably 30 wt. %, more preferably at least 50 wt. %, and most preferably at least 80 wt. % of the composition. If this component is added in the amount less than the recommended lower limit, a cured body of the composition will not be sufficiently strong.

In order to improve dispersion of component (IV) in component (I) or (II) and in order to improve affinity of component (IV) to components (I) or (II), the composition may contain a silane coupling agent, titanate coupling agent, or a similar coupling agent. Examples of the coupling agent are the same as mentioned above.

The composition may also incorporate component (V) in the form of a cure promoter for curing epoxy resin. Specific example of component (V) are the following: triphenylphosphine, tributylphosphine, tri(p-methylphenyl)phosphine, tri(nonylphenyl)phosphine, triphenylphosphine-triphenyl borate, tetraphenylphosphine-tetraphenyl borate, triphenylphosphine-quinone adduct, and other phosphorus compounds; triethylamine, benzyldimethylamine, α-methylbenzyldimethylamine, 1,8-diazabicyclo [5.4.0]undecene-7, and other tertiary amine compounds; 2-methylimidazole, 2-phenylimidazole, 2-phenyl-4-methylimidazole and other imidazole compounds.

There are no special restrictions with regard to the amount in which component (V) can be added to the composition, and it can be added in an amount in the range of 0.001 to 20 parts by weight per 100 parts by weight of component (I). This is due to the fact that if the component (V) is used in the amount below the recommended lower limit, it will be difficult to accelerate reaction thereof with components (I) and (II). If, on the other hand, the content of component (V) exceeds the recommended upper limit, there is a possibility that the mechanical strength of the cured resin may conspicuously decrease.

If necessary, the composition may be further combined with thermoplastic resins, thermoplastic elastomers, organosynthetic rubber, silicones, and other stress-reducing agents; carnauba wax, higher aliphatic acids, synthetic waxes, and other waxes; carbon black and other colorants; halogen trapping agents, ion trapping agents, etc.

There are no special restrictions with regard to the method for preparation of the composition, but in general the composition is prepared by uniformly mixing components (I) through (III), If necessary, with other arbitrary components. Dispersibility of component (III) is improved if this component is added to components (I) and (II) which are in a premixed state. Another example is mixing component (IV) with component (I) and then adding and uniformly mixing the obtained mixture with components (II), and (III), and, if necessary, with other arbitrary components. In this case, a coupling agent can be added to components (I) and (IV) by the integral method, or component (I) can be admixed with component (IV) after the latter is preliminarily surface-treated with the coupling agent. Equipment suitable for the preparation of the present composition may comprise a single-shaft or two-shaft continuous mixer, two-roll mill, Ross Mixer®, kneader-mixer, Henschel Mixer®, or a similar mixer or stirrer.

A cured product obtained by curing the curable epoxy resin composition of the present invention is characterized by high strength in spite of low modulus of elasticity. Therefore, the cured bodies of the composition are suitable for use as sealants or adhesives for electrical and electronics devices, especially for semiconductor devices.

EXAMPLES

The curable epoxy resin composition and the cured product obtained from the composition will now be described in more details with reference to practical examples. All characteristics given in the examples have values corresponding to 25° C. Characteristics of the silicone rubber powder were measured by the methods described below.

[Average Particle Size]

The aqueous suspension of the silicone rubber powder was measured by a Model LA-500 laser diffraction particle distribution measurement instrument made by Horiba, Ltd. The median diameter obtained (i.e., a particle diameter corresponding to 50% of the accumulated distribution) was defined as the average diameter of a cross-linked silicone particle.

[Type A Durometer Hardness]

After defoaming the silicone rubber composition that contained a condensation-reaction catalyst added for forming a silicone rubber powder, the suspension was allowed to stand for 1 day at 25° C. and used for manufacturing a 1 mm-thick silicone rubber sheet. Hardness of silicone rubber powder was measured according to JIS K 6253 by using a Wallace microhardness meter H5B manufactured by H. W. Wallace Co.

Characteristics of the curable epoxy resin composition and properties of the cured product obtained from the composition were measured by the methods described below. The curable epoxy resin composition was subjected to transfer press forming for 2 min. at 175° C. and under a pressure of 70 kgf/cm$^2$ and then cured by after curing the product for another 5 hours at 180° C.

Spiral flow: measured in accordance with EMMI standard at a temperature of 175° C. under a pressure of 70 kgf/cm$^2$.

Flexural modulus of elasticity: measured in accordance with JIS K 6911;

Flexural strength: measured in accordance with JIS K 6911.

Reference Example 1

A silicone rubber composition was prepared by uniformly mixing the following components: 86.4 parts by weight of a dimethylpolysiloxane having viscosity of 40 mPa·s and capped at both molecular terminals with silanol groups (content of silanol groups: 4.0 wt. %; on average 12 silicon atoms in one molecule); 9.1 parts by weight of a methylhydrogenpolysiloxane having viscosity of 10 mPa·s and capped at both molecular terminals with trimethylsiloxy groups (content of silicon-bonded hydrogen atoms: 1.5 wt. %); and 4.5 parts by weight of 3-glycidoxypropyl trimethoxysilane. After premixing 97 parts by weight of water with 5 parts by weight of a mixture obtained by mixing the obtained composition with secondary tridecyl ether and secondary dodecyl ether (7 mole addition) (43 wt. % of dodecyl groups, 57 wt. % of tridecyl groups; HLB=12.8), the product was emulsified in a colloidal mill, and diluted with 100 parts by weight of pure water, whereby an aqueous emulsion of a silicone rubber composition was obtained.

Next, an aqueous emulsion of a tin octoate having an average particle size of about 1.2 µm was prepared by emulsifying a mixture of 1 part by weight of a tin (II) octoate, a secondary tridecyl ether, and secondary dodecyl ether (7 mole addition) (43 wt. % of dodecyl groups, 57 wt. % of tridecyl groups; HLB=12.8) in 10 parts by weight of water. The obtained aqueous emulsion was added to and uniformly mixed with the aforementioned aqueous emulsion of the composition. The product was retained in quiescence for 1 day, and then the silicone rubber composition emulsified in water was cured to produce a gel-free uniform aqueous suspension of the silicone rubber powder. A silicone rubber powder was produced by drying the obtained aqueous suspension in a hot-air dryer. The obtained silicone rubber powder had an average particles size of 1.9 µm, particle sized distribution in the range of 0.1 to 40 µm, 90% cumulative particle size of 3.0 µm, type A durometer hardness of 67, and epoxy equivalent of 2800.

Reference Example 2

A silicone rubber powder was prepared by the same method as in Reference Example 1, except that 86.4 parts by weight of dimethylpolysiloxane having viscosity of 80 mPa·s and capped at both molecular terminals with silanol groups (content of silanol groups: 1.1 wt. %; on average 40 silicon atoms in one molecule) were used instead of 86.4 parts by weight of dimethylpolysiloxane having viscosity of 40 mPa·s and capped at both molecular terminals with silanol groups (content of silanol groups: 4.0 wt. %; on average 12 silicon atoms in one molecule). The obtained silicone rubber powder had an average particles size of 2.6 µm, particle sized distribution in the range of 0.1 to 100 µm 90% cumulative particle size of 6.5 µm, type A durometer hardness of 40, and epoxy equivalent of 4900.

Practical Example 1

A curable epoxy resin composition was obtained by fusing and uniformly mixing the following components between two hot rolls: 51.7 parts by weight of a biphenyl-aralkyl type epoxy resin (NC3000, the product of Nippon Kayaku Co., Ltd.; epoxy equivalent=275, melting point=56° C.); 38.3 parts by weight of a biphenyl-aralkyl type phenolic resin (MEH7851M, the product of Meiwa Plastic Industries, Ltd., equivalent of phenolic hydroxyl groups=207, melting point=80° C.); 9 parts by weight of the silicone rubber powder obtained in Reference Example 1; 510 parts by weight of amorphous spherical silica with an average particle size of 14 µm (FB-48X, the product of Denki Kagaku Kogyo Kabushki Kaisha); 1 part by weight of triphenylphosphine; and 1 part by weight of carnauba wax. The results of evaluation of the obtained epoxy resin composition and cured bodies produced by curing the composition are shown in Table 1.

Practical Example 2

A curable epoxy resin composition was obtained by fusing and uniformly mixing the following components between two hot rolls: 51.88 parts by weight of a biphenyl-aralkyl type epoxy resin (NC3000, the product of Nippon Kayaku Co., Ltd.; epoxy equivalent=275, melting point=56° C.); 38.12 parts by weight of a biphenyl-aralkyl type phenolic resin (MEH7851M, the product of Meiwa Plastic Industries, Ltd., equivalent of phenolic hydroxyl groups=207, melting point=80° C.); 18 parts by weight of the silicone rubber powder obtained in Reference Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

Practical Example 3

A curable epoxy resin composition was obtained by fusing and uniformly mixing the following components between two hot rolls: 52.07 parts by weight of a biphenyl-aralkyl type epoxy resin (NC3000, the product of Nippon Kayaku Co., Ltd.; epoxy equivalent=275, melting point=56° C.); 37.93 parts by weight of a biphenyl-aralkyl type phenolic resin (MEH7851M, the product of Meiwa Plastic Industries, Ltd., equivalent of phenolic hydroxyl groups=207, melting point=80° C.); 27 parts by weight of the silicone rubber powder obtained in Reference Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

Comparative Example 1

A curable epoxy resin composition was obtained by fusing and uniformly mixing the following components between two hot rolls: 51.3 parts by weight of a biphenyl-aralkyl type epoxy resin (NC3000, the product of Nippon Kayaku Co., Ltd.; epoxy equivalent=275, melting point=56° C.); 38.7 parts by weight of a biphenyl-aralkyl type phenolic resin (MEH7851M, the product of Meiwa Plastic Industries, Ltd., equivalent of phenolic hydroxyl groups=207, melting point=80° C.); 9 parts by weight of the silicone rubber powder obtained in Reference Example 2; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

Comparative Example 2

A curable epoxy resin composition was obtained by fusing and uniformly mixing the following components between two hot rolls: 51.09 parts by weight of a biphenyl-aralkyl type epoxy resin (NC3000, the product of Nippon Kayaku Co., Ltd.; epoxy equivalent=275, melting point=56° C.); 38.91 parts by weight of a biphenyl-aralkyl type phenolic resin (MEH7851M, the product of Meiwa Plastic Industries, Ltd., equivalent of phenolic hydroxyl groups=207, melting point=80° C.); 18 parts by weight of the silicone rubber powder obtained in Reference Example 2; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

Comparative Example 3

A curable epoxy resin composition was obtained by fusing and uniformly mixing the following components between two hot rolls: 50.88 parts by weight of a biphenyl-aralkyl type epoxy resin (NC3000, the product of Nippon Kayaku Co., Ltd.; epoxy equivalent=275, melting point=56° C.); 39.12 parts by weight of a biphenyl-aralkyl type phenolic resin (MEH7851M, the product of Meiwa Plastic Industries, Ltd., equivalent of phenolic hydroxyl groups=207, melting point=80° C.); 27 parts by weight of the silicone rubber powder obtained in Reference Example 2; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

Comparative Example 4

A curable epoxy resin composition was obtained by fusing and uniformly mixing the following components between two hot rolls: 51.51 parts by weight of a biphenyl-aralkyl type epoxy resin (NC3000, the product of Nippon Kayaku Co., Ltd.; epoxy equivalent=275, melting point=56° C.); 39.49 parts by weight of a biphenyl-aralkyl type phenolic resin (MEH7851M, the product of Meiwa Plastic Industries, Ltd., equivalent of phenolic hydroxyl groups=207, melting point=80° C.); 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 1.

TABLE 1

| | Practical Examples | | | Comparative Examples | | | |
|---|---|---|---|---|---|---|---|
| | 1 | 2 | 3 | 1 | 2 | 3 | 4 |
| Spiral flow (inch) | 10 | 10 | 10 | 12 | 11 | 9 | 13 |
| Flexural modulus of elasticity (kgf/mm$^2$) | 1880 | 1700 | 1500 | 1870 | 1615 | 1530 | 2170 |
| Flexural strength (kgf/mm$^2$) | 15.9 | 13.8 | 12.1 | 14.6 | 12.9 | 10.4 | 17.2 |

INDUSTRIAL APPLICABILITY

Since the curable epoxy resin composition of the invention possesses excellent flowability, it is suitable for transfer molding, injection molding, potting, casting, powder coating, immersion coating, drip coating. Since a cured product obtained by curing the curable epoxy resin composition possesses high strength in spite of low modulus of elasticity, the composition can be used as a sealing agent, coating material, filler, adhesive, or similar material for use in electric and electronic devices, in particular in semiconductor devices.

The invention claimed is:

1. A curable epoxy resin composition comprising:
   (I) a curable epoxy resin;
   (II) an epoxy-resin curing agent; and
   (III) a silicone rubber powder obtained by curing a condensation-curable silicone rubber composition in a dispersed state in water, the powder having an epoxy equivalent measured by titration equal to or lower than 3,000 and an average particle size in the range of 0.1 to 100 µm, wherein component (III) is a silicone rubber powder obtained by curing a silicone rubber composition comprising the following components (A) through (D) in a water-dispersed state:
   (A) a diorganopolysiloxane capped at both molecular terminals with silanol groups and having in one molecule 30 or less silicon atoms;
   (B) an organopolysiloxane having in one molecule at least two silicon-bonded hydrogen atoms wherein the mole number of silicon-bonded hydrogen atoms contained in this component is equal to or lower than 80% of the mole number of silanol groups in component (A);
   (C) an epoxy-containing alkoxysilane wherein the mole number of silicon-bonded alkoxy groups contained in this component is equal to or greater than 40% of the mole number of silanol groups remained after subtraction of the mole number of the silicon-bonded hydrogen atoms of component (B) from the mole number of silanol groups of component (A); and
   (D) a condensation-reaction catalyst in an amount of 0.01 to 5 parts by weight per 100 parts by weight of the sum of components (A) to (C).

2. The curable epoxy resin composition of claim 1, wherein component (I) is a biphenyl-containing epoxy resin.

3. The curable epoxy resin composition of claim 1, wherein component (II) is a compound that contains phenolic hydroxyl groups.

4. The curable epoxy resin composition of claim 3, wherein the compound (II) is a phenol resin that contains biphenyl groups.

5. The curable epoxy resin composition of claim 1, wherein component (II) is added in an amount at which the content of epoxy-reactive functional groups of component (II) is in the range of 0.5 to 2.5 moles per 1 mole of epoxy groups contained in component (I).

6. The curable epoxy resin composition of claim 1, wherein component (III) is a silicone rubber powder that has type A durometer hardness according to JIS K 6253 equal to or greater than 50.

7. The epoxy resin composition of claim 1, wherein component (III) is added in an amount of 0.1 to 100 parts by weight per 100 parts by weight of the sum of components (I) and (II).

8. The epoxy resin composition of claim 1, further comprising (IV) an inorganic filler.

9. The epoxy resin composition of claim 8, wherein component (IV) has particles of a spherical shape.

10. The epoxy resin composition of claim 8, wherein component (IV) is spherical amorphous silica.

11. The epoxy resin composition of claim 8, wherein component (IV) is added in an amount of at least 20 wt. % of the composition.

12. The epoxy resin composition of claim 1, further comprising (V) a cure promoter for curing the epoxy resin.

13. The epoxy resin composition of claim 12, wherein component (V) is added in an amount of 0.001 to 20 parts by weight per 100 parts by weight of component (I).

14. The epoxy resin composition according to claim 1, as a sealing agent for semiconductor devices.

15. A cured product obtained by curing the epoxy resin composition according to claim 1.

* * * * *